Patented Oct. 4, 1932

1,880,841

UNITED STATES PATENT OFFICE

ALFRED CURS, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

VESSEL FOR OPERATIONS WITH AMMONIA CARRIED OUT AT ELEVATED TEMPERATURES

No Drawing. Application filed March 27, 1929, Serial No. 350,455, and in Germany April 28, 1928.

This invention relates to an improved process for operating with ammonia.

When operating with ammonia or gases containing it at high temperatures surpassing 500° C., such for example at 600° C. and higher, in metallic vessels or apparatus, the inconvenience arises from the fact that the ammonia becomes more or less extensively decomposed to hydrogen and nitrogen, iron having a particularly powerful effect in this respect.

I have now found that the said decomposition of ammonia is prevented to a very considerable degree when carrying out the operations with ammonia in vessels and apparatus the parts of which coming into contact with ammonia at high temperatures are constructed of or lined with silicon or substances containing silicon in a free elementary state such as silicon alloys containing free elementary silicon. That is to say the ammonia when at a high temperature is only allowed to come into contact with apparatus the surfaces of which consist of silicon or substances containing silicon, such as silicon alloys, these substances being hereinafter referred to as "siliceous substances". It has been found that, under these conditions, silicon has practically no decomposing action on ammonia. Since, however, silicon is a brittle material, which is very difficult to work, even in the form of alloys rich in silicon, it is impossible, in many instances, to employ it as constructional material, and in such cases, it is advisable to apply to the metal walls of the vessels a layer consisting mainly of or containing a considerable amount of elementary silicon, in order to protect the ammonia against the decomposing action of the walls. The lining may be prepared and applied, for example, by means of a cement made from a binding medium, such as water glass and powdered silicon, or in other ways. Alloys, such as those of copper and silicon, may be used, provided the amount of their metallic constituents capable of decomposing ammonia does not surpass the limits at which their decomposing action would occur to an undesirable degree.

The said operations with ammonia or gases comprising ammonia are preferably those in which the ammonia is converted into more valuable products, such as the production of calcium cyanamide, the production of hydrocyanic acid from carbon monoxide and ammonia, the production of metal nitrides by the action of ammonia on metals, and the like.

The following examples will further illustrate the nature of the invention, but the invention is not restricted to these examples.

Example 1

An iron reaction vessel, preferably a tube of an inner diameter of 40 centimeters and of a length of 120 centimeters is lined with a paste of silica gel and water glass containing about 50 per cent of finely granulated silicon, and the lining is then dried and burnt at about 850° C. The tube is then filled with calcium carbonate, and ammonia is passed through at the rate of 15 cubic meters per hour at about 725° C. Only 0.6 per cent of the portion of the ammonia not converted into calcium cyanamide is decomposed during the said process.

Example 2

A tube obtained by casting an alloy of copper with a content of 20 per cent of silicon is protected against mechanical damage by covering it with an iron shell, and the tube is then employed in the process described in the foregoing example. Only 0.5 per cent of the non-converted ammonia is decomposed.

What I claim is:

1. In operations carried out with gases comprising ammonia at high temperatures, the step of allowing the ammonia, while at a high temperature, to come into contact only with such surfaces of the apparatus as consist of a material comprising elementary silicon.

2. In operations carried out with gases comprising ammonia at high temperatures, the step of allowing the ammonia, while at temperatures surpassing 500° C., to come into contact only with such surfaces of the apparatus as consist of a material comprising elementary silicon.

3. In operations carried out with gases comprising ammonia at high temperatures, in which the ammonia is converted into more valuable products, the step of allowing the ammonia, while at temperatures of at least 600° C., to come into contact only with such surfaces of the apparatus as consist of a material comprising elementary silicon.

4. In operations carried out with gases comprising ammonia at high temperatures, in which the ammonia is converted into more valuable products, the step of allowing the ammonia, while at temperatures of at least 600° C., to come into contact only with such surfaces of the apparatus as are covered with a layer containing considerable amounts of free elementary silicon.

5. In operations carried out with gases comprising ammonia at high temperatures, in which the ammonia is converted into more valuable products, the step of allowing the ammonia, while at temperatures of at least 600° C., to come into contact only with such surfaces of the apparatus as are covered with a layer comprising a binding agent and considerable amounts of free elementary silicon.

6. The process for the production of calcium cyanamide, which comprises passing ammonia at a temperature of about 725° C. over calcium carbonate arranged in an iron reaction vessel, lined by covering the surfaces thereof with a paste of silica gel, water glass and granulated silicon, drying and burning.

7. Apparatus for operating with gases comprising ammonia at high temperatures, the surfaces of which coming into contact with ammonia consist of a material comprising elementary silicon.

8. Apparatus for operating with gases comprising ammonia at high temperatures, the surfaces of which coming into contact with ammonia are covered with a layer containing considerable amounts of free elementary silicon.

9. Apparatus for operating with gases comprising ammonia at high temperatures, the surfaces of which coming into contact with ammonia are covered with a layer comprising a binding agent and considerable amounts of free elementary silicon.

10. Apparatus for operating with gases comprising ammonia at high temperatures, the surfaces of which coming into contact with ammonia are covered with a layer hardened by burning a paste comprising silica gel, water glass and granulated silicon.

In testimony whereof I have hereunto set my hand.

ALFRED CURS.